US011988122B2

(12) United States Patent
Iossa et al.

(10) Patent No.: US 11,988,122 B2
(45) Date of Patent: May 21, 2024

(54) EXHAUST SOUND BYPASS

(71) Applicant: McLaren Automotive Limited, Woking (GB)

(72) Inventors: Giuseppe Iossa, Barcelona (ES); Andreas Rousounelos, Woking (GB); Marciano Demetrio, Calibria (IT)

(73) Assignee: McLaren Automotive Limited, Woking (GB)

(*) Notice: Subject to any disclaimer, the term of this patent is extended or adjusted under 35 U.S.C. 154(b) by 609 days.

(21) Appl. No.: 16/982,462

(22) PCT Filed: Mar. 18, 2019

(86) PCT No.: PCT/GB2019/050753

§ 371 (c)(1),
(2) Date: Sep. 18, 2020

(87) PCT Pub. No.: WO2019/180412

PCT Pub. Date: Sep. 26, 2019

(65) Prior Publication Data

US 2021/0062696 A1 Mar. 4, 2021

(30) Foreign Application Priority Data

Mar. 19, 2018 (GB) ..................................... 1804375

(51) Int. Cl.
*F01N 1/22* (2006.01)
*F01N 1/06* (2006.01)
(Continued)

(52) U.S. Cl.
CPC ............... *F01N 1/065* (2013.01); *F01N 1/22* (2013.01); *F01N 13/08* (2013.01); *F01N 13/10* (2013.01); *G10K 11/22* (2013.01); *F01N 1/20* (2013.01)

(58) Field of Classification Search
CPC ............ F01N 1/22; F01N 13/08; F01N 13/10; F02M 35/1222; F02M 35/1294; G10K 11/22
See application file for complete search history.

(56) References Cited

U.S. PATENT DOCUMENTS 6,644,436 B2 * 11/2003 Hofmann ................ F02B 77/13
181/240
10,724,410 B1 * 7/2020 Waisanen ............... B63H 20/24
(Continued)

FOREIGN PATENT DOCUMENTS

DE 10 2010 053075 A1 6/2012
EP 2 400 142 A1 12/2011
(Continued)

OTHER PUBLICATIONS

DE-102016200536-B3 Translation (Year: 2016).*
(Continued)

*Primary Examiner* — Bickey Dhakal
*Assistant Examiner* — Jennifer B. Olson
(74) *Attorney, Agent, or Firm* — Fish & Richardson P.C.

(57) ABSTRACT

A vehicle comprising: an internal combustion engine having a cylinder and an exhaust manifold for collecting exhaust gases expelled from the cylinder; an exhaust system configured to channel exhaust gases along a flow path from the exhaust manifold to an exhaust outlet, the exhaust system comprising an exhaust component configured to cause an alteration to engine-generated sound pulses passing through the exhaust component; and a sound bypass device comprising a sound inlet port at a first location on the exhaust system before a first exhaust component along the flow path and a sound outlet port at a second location on the exhaust system after the first exhaust component along the flow path, the sound bypass device being configured to transmit engine-generated sound pulses from the sound inlet port to
(Continued)

the sound outlet port whilst preventing flow of exhaust gases from the sound inlet port to the sound outlet port.

23 Claims, 2 Drawing Sheets

(51) Int. Cl.

| | |
|---|---|
| ***F01N 13/08*** | (2010.01) |
| ***F01N 13/10*** | (2010.01) |
| ***G10K 11/22*** | (2006.01) |
| *F01N 1/20* | (2006.01) |

(56) References Cited

U.S. PATENT DOCUMENTS

| | | | | |
|---|---|---|---|---|
| 2002/0157897 | A1 | 10/2002 | Hoffman et al. | |
| 2005/0121254 | A1 | 6/2005 | Hoffman et al. | |
| 2013/0199487 | A1 * | 8/2013 | Bernard | G10K 15/02 123/184.53 |
| 2017/0107921 | A1 | 4/2017 | Seldon et al. | |

FOREIGN PATENT DOCUMENTS

| | | | | |
|---|---|---|---|---|
| EP | 3 392 479 | A1 | 10/2018 | |
| EP | 3392479 | A1 * | 10/2018 | F01N 1/023 |
| GB | 2556046 | A | 5/2018 | |
| JP | 2008 150968 | A | 7/2008 | |
| WO | WO 2018/086971 | A1 | 5/2018 | |

OTHER PUBLICATIONS

Notification of Transmittal of the International Search Report and The Written Opinion of the international Searching Authority, or the Declaration issued in corresponding Int. Appl. No. PCT/GB2019/050753, dated May 27, 2019, 23 pages.

Search Report under Section 17(5) issued in corresponding Application No. GB1804375.2 dated Aug. 29, 2018, 4 pages.

* cited by examiner

EXHAUST SOUND BYPASS

CROSS-REFERENCE TO RELATED APPLICATIONS

The present application is the national stage entry of International Patent Application No. PCT/GB2019/050753, filed on Mar. 18, 2019, and claims priority to Application No. GB 1804375.2, filed in the United Kingdom on Mar. 19, 2018, the disclosures of which are expressly incorporated herein in its entirety by reference thereto.

FIELD OF THE INVENTION

This invention relates to a vehicle comprising a sound bypass device and a sound transmission device for an exhaust system of a vehicle.

BACKGROUND

Vehicles that burn fuel using an engine generally have an exhaust system to channel the exhaust gases generated by the engine away from the engine so that they can be output to the surroundings of the vehicle. It is common for the exhaust system to have one or more exhaust components that act on the flow of the exhaust gases in some way. For instance, the exhaust system may comprise a turbo charger which uses the flow of the exhaust gases to accelerate the flow of gases entering the engine and/or comprise a catalytic converter which converts exhaust gases into less-toxic gases.

The presence of these exhaust components affects the flow of the exhaust gases through the exhaust system to at least one outlet of the exhaust system. As the exhaust system also channels engine sounds from the engine to the outlet(s), these exhaust components can also alter the engine sounds that emanate from the outlet(s). This generally can mean that the engine sounds that emanate from the outlet(s) can be muffled and/or altered in some way compared to the engine sounds that would emanate from the at least one outlet if those exhaust components were not present.

The alteration of the sound that emanates from the at least one outlet to the exterior of the vehicle can be undesirable as it can give the appearance that the vehicle is not performing properly or is not performing at a high level. It can be particularly undesirable in high-performance vehicles such as sports cars because the impression of the performance of the vehicle is linked to what the engine of the vehicle sounds like. The sounds that emanate from the exhaust outlet are generally the primary means by which the sound of the engine is characterised. Therefore, it is desirable for there to be an improved way of delivering engine sounds from an exhaust system that comprises exhaust components that act on the flow of the exhaust gases.

SUMMARY

According to a first aspect of the present invention there is provided a vehicle comprising: an internal combustion engine having at least one cylinder, the internal combustion engine comprising an exhaust manifold for collecting exhaust gases expelled from the at least one cylinder; an exhaust system configured to channel exhaust gases along a flow path from the exhaust manifold to at least one exhaust outlet, the exhaust system comprising at least one exhaust component configured to act on exhaust gases flowing though the exhaust component and causing an alteration to engine-generated sound pulses passing through the exhaust component; and a sound bypass device comprising a sound inlet port at a first location on the exhaust system before a first exhaust component along the flow path and a sound outlet port at a second location on the exhaust system after the first exhaust component along the flow path, the sound bypass device being configured to transmit engine-generated sound pulses from the sound inlet port to the sound outlet port whilst preventing flow of exhaust gases from the sound inlet port to the sound outlet port.

The sound bypass device may comprise a sound transmission device, the sound transmission device may be connected to the sound inlet port and the sound outlet port, and the sound transmission device may be configured to transmit engine-generated sound pulses from the sound inlet port to the sound outlet port whilst preventing the flow of exhaust gases from the sound inlet port to the sound outlet port. The sound transmission device may comprise a sound inlet port and a outlet port, the sound inlet port of the sound transmission device may be connected to the sound inlet port of the sound bypass device and the sound outlet port of the sound transmission device being connected to the sound outlet port of the sound bypass device.

The sound bypass device may comprise a first sound transmission tube connected to the sound inlet port of the sound bypass device, the first sound transmission tube may be adapted to conduct engine-generated sound pulses from the first location of the exhaust system. The sound bypass device may comprise a second sound transmission tube connected to the sound outlet port of the sound bypass device, the second sound transmission tube may be adapted to conduct engine-generated sound pulses to the second location of the exhaust system. The sound inlet port of the sound transmission device may be connected to the first sound transmission tube and operable to receive engine-generated sound pulses conducting along the first sound transmission tube, and the sound outlet port of the sound transmission device may be connected to the second sound transmission tube to output engine-generated sound pulses received by the sound transmission device via the first sound transmission tube to the second sound transmission tube.

The sound transmission device may comprise a diaphragm housed in a chamber connected to the first sound transmission tube, the diaphragm may be connected across the chamber and configured such that, in response to engine-generated sound pulses being conducted to along the first sound transmission tube into the chamber, the diaphragm vibrates so as to transmit the engine-generated sound pulses across the diaphragm from a first side of the chamber at which the first sound transmission tube is connected to a second side of the chamber at which the second sound transmission tube is connected. The diaphragm may be connected across the chamber to prevent flow of exhaust gases from the first side of the chamber to the second side of the chamber. The chamber may be divided into a first volume, to the first side of the chamber, and a second volume, to the second side of the chamber, the first volume being defined by the diaphragm, a first end wall and a first flexible membrane connected between the diaphragm and the first end wall to enclose the first volume, the second volume may be defined by the diaphragm a second end wall and a second flexible membrane connected between the diaphragm and the second end wall to enclose the second volume. The first and second flexible membranes may resiliently bias the diaphragm to a rest position when no engine-generated sound pulses are being transmitted through the sound bypass device. The first and second flexible membranes may be bellows. The first and second flexible membranes may be bellows having concertinaed sides, the diaphragm may have two faces, one facing towards each of the first and second volumes, and the concertinas may run parallel to the faces of the diaphragm. The first and second membranes may be formed as one piece with the diaphragm disposed along the piece's length.

The exhaust system may comprise a plurality of exhaust pipes which respectively channel the exhaust gases from the exhaust manifold to an exhaust component, and from an exhaust component to at least one exhaust outlet. The exhaust system may comprise a plurality of exhaust components and the plurality of exhaust pipes may respectively channel the exhaust gases from the exhaust manifold to an exhaust component, between the exhaust components, and from an exhaust component to at least one exhaust outlet. The first location may be on an exhaust pipe which channels exhaust gases from the exhaust manifold to the first exhaust component. The first location may be on an exhaust pipe which channels exhaust gases between a second exhaust component and the first exhaust component. The second location may be on an exhaust pipe after the first exhaust component along the flow path. The second location may be on an exhaust pipe which channels exhaust gases to the at least one exhaust outlet.

The exhaust system may comprise a plurality of exhaust components, the exhaust components may be one or more of a turbocharger, an exhaust gas treatment device, and a silencer. The first exhaust component may be a turbocharger. The exhaust system may comprise a turbocharger as the first exhaust component, a catalytic convertor, a gasoline particulate filter and a silencer, the turbocharger may be connected to the exhaust manifold by a first exhaust pipe, the turbocharger may be connected to the catalytic convertor by a second exhaust pipe, the catalytic convertor may be connected to the gasoline particular filter by a third exhaust pipe, the gasoline particular filter may be connected to the silencer by a fourth exhaust pipe and the silencer may be connected to the at least one exhaust outlet by a fifth exhaust pipe. The first location may be on the first exhaust pipe and the second location is on the fifth exhaust pipe.

The internal combustion engine may comprise a plurality of cylinders and two exhaust manifolds for collecting exhaust gases expelled from respective sets of cylinders, the exhaust system may be configured to channel exhaust gases along a first flow path from a first exhaust manifold to at least one exhaust outlet and a second flow path from a second exhaust manifold to at least one exhaust outlet, the exhaust system may comprise at least one exhaust component configured to act on exhaust gases flowing along the first flow path and at least one exhaust component configured to act on exhaust gases flowing along the second flow path, and the vehicle may comprise: a first sound bypass device comprising a first sound inlet port at a first location on the first flow path of the exhaust system before a first exhaust component along the first flow path and a first sound outlet port at a second location on the first flow path of the exhaust system after the first exhaust component along the first flow path, the sound bypass device being configured to transmit engine-generated sound pulses from the first sound inlet port to the first sound outlet port whilst preventing flow of exhaust gases from the first sound inlet port to the first sound outlet port; and a second sound bypass device comprising a second sound inlet port at a first location on the second flow path of the exhaust system before a first exhaust component along the second flow path and a second sound outlet port at a second location on the second flow path of the exhaust system after the first exhaust component along the second flow path, the second sound bypass device being configured to transmit engine-generated sound pulses from the second sound inlet port to the second sound outlet port whilst preventing flow of exhaust gases from the second sound inlet port to the second sound outlet port.

According to a second aspect of the present invention there is provided a vehicle comprising: an internal combustion engine having at least one cylinder, the internal combustion engine comprising an exhaust manifold for collecting exhaust gases expelled from the at least one cylinder; an exhaust system configured to channel exhaust gases along a flow path from the exhaust manifold to at least one exhaust outlet, the exhaust system comprising at least one exhaust component configured to act on exhaust gases flowing though the exhaust component and causing an alteration to engine-generated sound pulses passing through the exhaust component; and a sound bypass device comprising a sound inlet port at a first location on the exhaust system before a first exhaust component along the flow path and a sound outlet port at a second location on the exhaust system after the first exhaust component along the flow path, the sound bypass device being configured to transmit engine-generated sound pulses from the sound inlet port to the sound outlet port whilst preventing flow of exhaust gases from the sound inlet port to the sound outlet port, the sound bypass device further comprising a sound transmission device, the sound transmission device comprising: a sound inlet port being connected to the sound inlet port of the sound bypass device and a sound outlet port being connected to the sound outlet port of the sound bypass device, the sound transmission device being configured to transmit engine-generated sound pulses from the sound inlet port of the sound bypass device to the sound outlet port of the sound bypass device whilst preventing the flow of exhaust gases from the sound inlet port of the sound bypass device to the sound outlet port of the sound bypass device; and a diaphragm housed in a chamber connected to the first sound inlet port of the sound transmission device, the diaphragm being connected across the chamber and configured such that, in response to engine-generated sound pulses being conducted from the sound inlet port of the sound transmission device into the chamber, the diaphragm vibrates so as to transmit the engine-generated sound pulses across the diaphragm from a first side of the chamber at which the sound inlet port of the sound transmission device is located to a second side of the chamber at which the sound outlet port of the sound transmission device is located, the chamber being divided into a first volume, to the first side of the chamber, and a second volume, to the second side of the chamber, the first volume being defined by the diaphragm, a first end wall and a first flexible membrane connected between the diaphragm and the first end wall to enclose the first volume, the second volume being defined by the diaphragm a second end wall and a second flexible membrane connected between the diaphragm and the second end wall to enclose the second volume.

According to a third aspect of the present invention there is provided a vehicle comprising: an internal combustion engine having at least one cylinder, the internal combustion engine comprising an exhaust manifold for collecting exhaust gases expelled from the at least one cylinder; an exhaust system configured to channel exhaust gases along a flow path from the exhaust manifold to at least one exhaust outlet, the exhaust system comprising at least one exhaust component configured to act on exhaust gases flowing though the exhaust component and causing an alteration to engine-generated sound pulses passing through the exhaust component; and a sound bypass device comprising: a sound inlet port at a first location on the exhaust system before a first exhaust component along the flow path; a sound outlet port at a second location on the exhaust system after the first exhaust component along the flow path; a first sound transmission tube connected to the sound inlet port and being adapted to conduct engine-generated sound pulses from the first location of the exhaust system; a second sound transmission tube connected to the sound outlet port and being adapted to conduct engine-generated sound pulses to the second location of the exhaust system; the sound bypass device being configured to transmit engine-generated sound pulses from the sound inlet port to the sound outlet port whilst preventing flow of exhaust gases from the sound inlet port to the sound outlet port; the sound bypass device further comprising: a sound transmission device, the sound transmission device being connected to the sound inlet port and the sound outlet port, and the sound transmission device being configured to transmit engine-generated sound pulses from the sound inlet port to the sound outlet port whilst preventing the flow of exhaust gases from the sound inlet port to the sound outlet port, the sound transmission device comprising: a sound inlet port being connected to the sound inlet port of the sound bypass device and a sound outlet port being connected to the sound outlet port of the sound bypass device, the first sound transmission tube being connected to the sound inlet port of the sound transmission device, the sound inlet port of the sound transmission device being operable to receive engine-generated sound pulses conducting along the first sound transmission tube and the second transmission tube being connected to the sound outlet port of the sound transmission device to output engine-generated sound pulses received by the sound transmission device via the first sound transmission tube to the second sound transmission tube; and a diaphragm housed in a chamber connected to the first sound transmission tube, the diaphragm being connected across the chamber and configured such that, in response to engine-generated sound pulses being conducted to along the first sound transmission tube into the chamber, the diaphragm vibrates so as to transmit the engine-generated sound pulses across the diaphragm from a first side of the chamber at which the first sound transmission tube is connected to a second side of the chamber at which the second sound transmission tube is connected, the chamber being divided into a first volume, to the first side of the chamber, and a second volume, to the second side of the chamber, the first volume being defined by the diaphragm, a first end wall and a first flexible membrane connected between the diaphragm and the first end wall to enclose the first volume, the second volume being defined by the diaphragm a second end wall and a second flexible membrane connected between the diaphragm and the second end wall to enclose the second volume.

The diaphragm may be connected across the chamber to prevent flow of exhaust gases from the first side of the chamber to the second side of the chamber. The first and second flexible membranes may resiliently bias the diaphragm to a rest position when no engine-generated sound pulses are being transmitted through the sound bypass device. The first and second flexible membranes may be bellows. The first and second flexible membranes may be bellows having concertinaed sides, the diaphragm having two faces, one facing towards each of the first and second volumes, and the concertinas running parallel to the faces of the diaphragm. The first and second membranes may be formed as one piece with the diaphragm disposed along the piece's length.

The exhaust system may comprise a plurality of exhaust pipes which respectively channel the exhaust gases from the exhaust manifold to an exhaust component, and from an exhaust component to at least one exhaust outlet. The exhaust system may comprise a plurality of exhaust components and the plurality of exhaust pipes may respectively channel the exhaust gases from the exhaust manifold to an exhaust component, between the exhaust components, and from an exhaust component to at least one exhaust outlet. The first location may be on an exhaust pipe which channels exhaust gases from the exhaust manifold to the first exhaust component. The first location may be on an exhaust pipe which channels exhaust gases between a second exhaust component and the first exhaust component. The second location may be on an exhaust pipe after the first exhaust component along the flow path. The second location may be on an exhaust pipe which channels exhaust gases to the at least one exhaust outlet.

The exhaust system may comprise a plurality of exhaust components, the exhaust components being one or more of a turbocharger, an exhaust gas treatment device, and a silencer. The first exhaust component may be a turbocharger. The exhaust system may comprise a turbocharger as the first exhaust component, a catalytic convertor, a gasoline particulate filter and a silencer, the turbocharger may be connected to the exhaust manifold by a first exhaust pipe, the turbocharger may be connected to the catalytic convertor by a second exhaust pipe, the catalytic convertor may be connected to the gasoline particular filter by a third exhaust pipe, the gasoline particular filter may be connected to the silencer by a fourth exhaust pipe and the silencer may be connected to the at least one exhaust outlet by a fifth exhaust pipe. The first location may be on the first exhaust pipe and the second location is on the fifth exhaust pipe.

The internal combustion engine may comprise a plurality of cylinders and two exhaust manifolds for collecting exhaust gases expelled from respective sets of cylinders, the exhaust system may be configured to channel exhaust gases along a first flow path from a first exhaust manifold to at least one exhaust outlet and a second flow path from a second exhaust manifold to at least one exhaust outlet, the exhaust system may comprise at least one exhaust component configured to act on exhaust gases flowing along the first flow path and at least one exhaust component configured to act on exhaust gases flowing along the second flow path, and the vehicle may comprise: a first sound bypass device comprising a first sound inlet port at a first location on the first flow path of the exhaust system before a first exhaust component along the first flow path and a first sound outlet port at a second location on the first flow path of the exhaust system after the first exhaust component along the first flow path, the sound bypass device being configured to transmit engine-generated sound pulses from the first sound inlet port to the first sound outlet port whilst preventing flow of exhaust gases from the first sound inlet port to the first sound outlet port; and a second sound bypass device comprising a second sound inlet port at a first location on the second flow path of the exhaust system before a first exhaust component along the second flow path and a second sound outlet port at a second location on the second flow path of the exhaust system after the first exhaust component along the second flow path, the second sound bypass device being configured to transmit engine-generated sound pulses from the second sound inlet port to the second sound outlet port whilst preventing flow of exhaust gases from the second sound inlet port to the second sound outlet port.

According to a fourth aspect of the present invention there is provided a vehicle comprising: an internal combustion engine comprising a plurality of cylinders and two exhaust manifolds for collecting exhaust gases expelled from respective sets of cylinders; an exhaust system configured to channel exhaust gases along a first flow path from the first exhaust manifold to at least one exhaust outlet and a second flow path from the second exhaust manifold to at least one exhaust outlet, the exhaust system comprising at least one exhaust component configured to act on exhaust gases flowing along the first flow path and at least one exhaust component configured to act on exhaust gases flowing along the second flow path, the exhaust components being configured to act on exhaust gases flowing though the exhaust component and cause an alteration to engine-generated sound pulses passing through the exhaust component; a first sound bypass device comprising a first sound inlet port at a first location on the first flow path of the exhaust system before a first exhaust component along the first flow path and a first sound outlet port at a second location on the first flow path of the exhaust system after the first exhaust component along the first flow path, the sound bypass device being configured to transmit engine-generated sound pulses from the first sound inlet port to the first sound outlet port whilst preventing flow of exhaust gases from the first sound inlet port to the first sound outlet port; and a second sound bypass device comprising a second sound inlet port at a first location on the second flow path of the exhaust system before a first exhaust component along the second flow path and a second sound outlet port at a second location on the second flow path of the exhaust system after the first exhaust component along the second flow path, the second sound bypass device being configured to transmit engine-generated sound pulses from the second sound inlet port to the second sound outlet port whilst preventing flow of exhaust gases from the second sound inlet port to the second sound outlet port.

The first exhaust component may be a first turbocharger and the second exhaust component is a second turbocharger.

According to a fifth aspect of the present invention there is provided a sound transmission device for connection to an exhaust system of a vehicle, the exhaust system being configured to channel exhaust gases along a flow path from an engine to at least one exhaust outlet, the sound transmission device comprising: a sound inlet port and a sound outlet port, the sound transmission device being configured to transmit engine-generated sound pulses from the sound inlet port to the sound outlet port whilst preventing the flow of exhaust gases from the sound inlet port to the sound outlet port; and a diaphragm housed in a chamber connected to the first inlet port, the diaphragm being connected across the chamber and configured such that, in response to engine-generated sound pulses being conducted from the sound inlet port of the sound transmission device into the chamber, the diaphragm vibrates so as to transmit the engine-generated sound pulses across the diaphragm from a first side of the chamber at which the sound inlet port of the sound transmission device is located to a second side of the chamber at which the sound outlet port of the sound transmission device is located, the chamber being divided into a first volume, to the first side of the chamber, and a second volume, to the second side of the chamber, the first volume being defined by the diaphragm, a first end wall and a first flexible membrane connected between the diaphragm and the first end wall to enclose the first volume, the second volume being defined by the diaphragm a second end wall and a second flexible membrane connected between the diaphragm and the second end wall to enclose the second volume.

The diaphragm may be connected across the chamber to prevent flow of exhaust gases from the first side of the chamber to the second side of the chamber. The first and second flexible membranes may resiliently bias the diaphragm to a rest position when no engine-generated sound pulses are being transmitted through the sound transmission device.

The first and second flexible membranes are bellows. The first and second flexible membranes may be bellows having concertinaed sides, the diaphragm may have two faces, one facing towards each of the first and second volumes, and the concertinas running parallel to the faces of the diaphragm. The first and second membranes may be formed as one piece with the diaphragm disposed along the piece's length.

BRIEF DESCRIPTION OF THE FIGURES

The present invention will now be described by way of example with reference to the accompanying drawings. In the drawings.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

DETAILED DESCRIPTION

The present invention relates to a vehicle comprising an internal combustion engine having at least one cylinder, the internal combustion engine comprising an exhaust manifold for collecting exhaust gases expelled from the at least one cylinder. The vehicle comprises an exhaust system configured to channel exhaust gases along a flow path from the exhaust manifold to at least one exhaust outlet, the exhaust system comprising at least one exhaust component configured to act on exhaust gases flowing though the exhaust component and causing an alteration to engine-generated sound pulses passing through the exhaust component. The vehicle comprises a sound bypass device comprising a sound inlet port at a first location on the exhaust system before a first exhaust component along the flow path and a sound outlet port at a second location on the exhaust system after the first exhaust component along the flow path, the sound bypass device being configured to transmit engine-generated sound pulses from the sound inlet port to the sound outlet port whilst preventing flow of exhaust gases from the sound inlet port to the sound outlet port.

An internal combustion engine to which the principles described herein apply is not limited in its configuration and could be a straight, flat or V-engine having any number of cylinders. The internal combustion engine may be part of a hybrid drive system for the vehicle where the vehicle comprises one or more electrical machines and an internal combustion engine that can separately and/or in combination drive the vehicle. For example, the internal combustion engine may be part of a parallel hybrid drive system whereby one or more electrical machines and the internal combustion engine each generate torques that can separately and/or in combination be delivered to the wheels of the vehicle for driving the vehicle. Alternatively, the internal combustion engine may be part of a series hybrid drive system whereby the internal combustion engine is coupled to one or more first electrical machines which generate power from the engine torque generated by the internal combustion engine. The power generated by the one or more first electrical machines may be transferred to one or more second electrical machines to generate motor torques for driving the vehicle.

Figure 1:
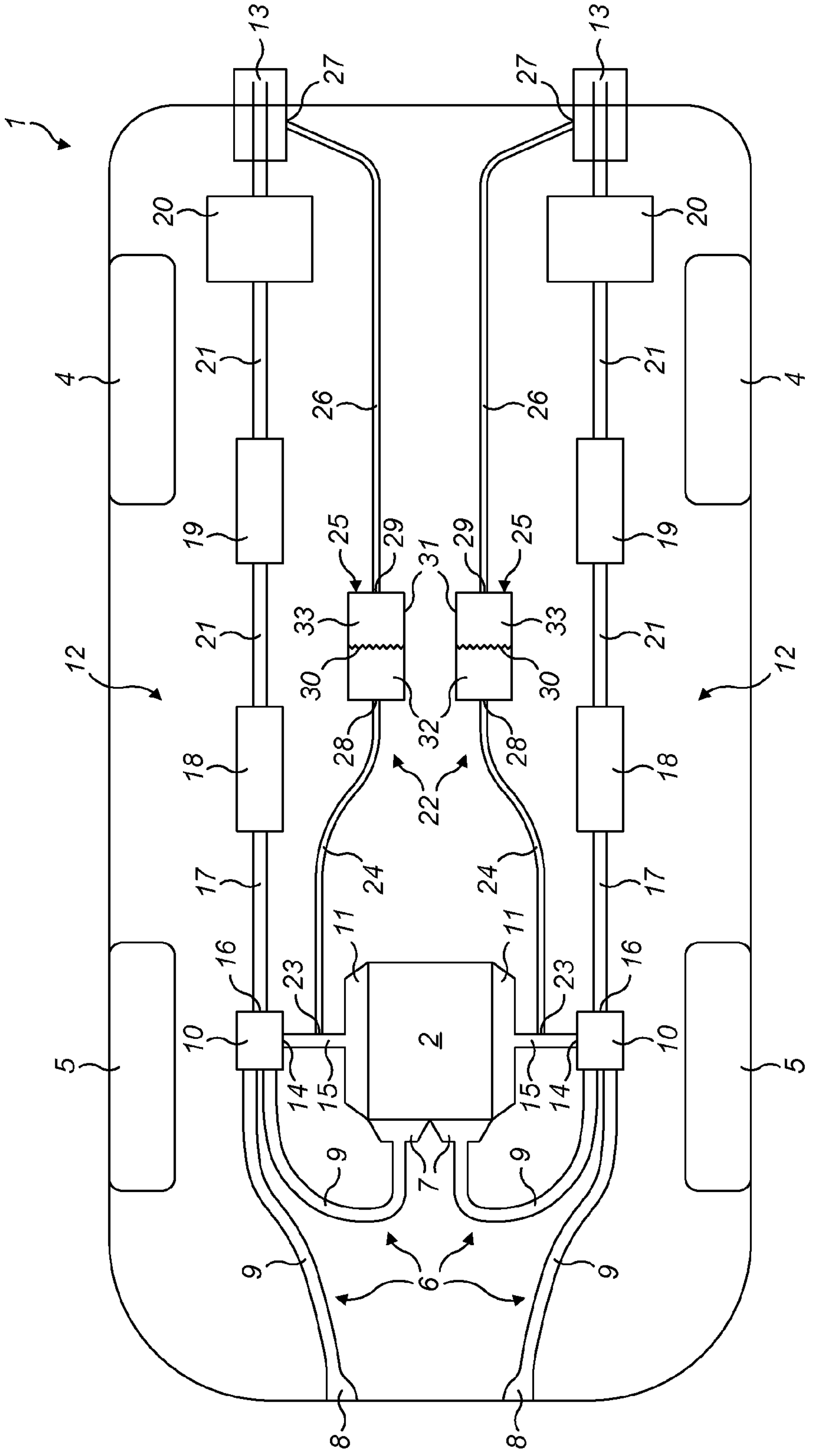
FIG. 1 shows is a schematic diagram of a vehicle comprising a sound bypass device.

FIG. 1 shows a vehicle 1. Vehicle comprises an internal combustion engine 2. Internal combustion engine 2 may be coupled to a drive system for the transference of an engine torque, generated by the internal combustion engine 2, from the internal combustion engine 2 to drive wheels 4 of the vehicle 1. Alternatively, as discussed above, internal combustion engine 2 may be coupled to the drive system for the transference of an engine torque to one or more first electrical machines for the generation of drive power. The one or more first electrical machines may be coupled to one or more second electrical machines to receive the drive power and generate motor torques to drive wheels 4 of the vehicle 1. These electrical machines together with the internal combustion engine 2 may together form a powertrain of the vehicle 1.

The vehicle may comprise a plurality of wheels 4, 5 for supporting the vehicle 1 on a surface. Some of those wheels may be drive wheels and some of those wheels may be non-drive wheels 5. It will be appreciated that any configuration of drive 4 and non-drive 5 wheels may be used depending on the particular drive characteristics required by the vehicle 1.

The vehicle 2 may comprise an air intake system 6 for internal combustion engine 2. The intake system 6 may comprise an intake manifold 7 that is fed an air mixture by at least one intake port. In the example shown in FIG. 1, the vehicle comprises two intake manifolds 7 that are fed an air mixture by air inlet pipes 9. Air flows into the intake system from one or more intake inlets 8 via the air inlet pipes 9. Generally, these are located on the exterior of the vehicle to permit air to flow into the inlets. The flow of air into the intake system may be assisted by one or more induction devices. The induction devices may be one or more turbochargers and/or superchargers. In the example shown in FIG. 1, a turbocharger 10 is provided for each intake manifold. Each turbocharger 10 is connected between the intake inlet and their respective intake manifolds 7.

The flow of air mixture, via the at least one intake port, in to the intake manifold 7 may be regulated by at least one throttle. The intake manifold permits the flow of the air mixture from the intake ports to the cylinders of the engine 2. The cylinders each house a piston which is caused to move by the ignition of fuel present in the respective cylinder. The pistons are each coupled to a drive an axel of the engine 2 to enable generation of the engine torque by means of the movement of the pistons. The entry and exit of gases into and out of the cylinders are regulated by a plurality of valves for each cylinder. Generally, some of the valves (intake valves) regulate the flow of combustion gases into a cylinder and some of the valves (exhaust valves) regulate the flow of exhaust gases out of a cylinder.

The internal combustion engine 2 may comprise one or more exhaust manifolds 11 which collect the exhaust gases expelled from the cylinders of the engine 2. The exhaust gases are expelled from the cylinders via the plurality of exhaust valves. In the example shown in FIG. 1, the engine 2 comprises two exhaust manifolds 11. Each exhaust manifold collects exhaust gases expelled from a separate set of cylinders of the engine 2.

The vehicle 1 may comprise an exhaust system 12 which channels the exhaust gases from the exhaust manifold to at least one exhaust outlet 13. If there is only one exhaust manifold present in the vehicle then the exhaust system 12 may channel the exhaust gases from that exhaust manifold to at least one exhaust outlet 13. In some vehicles there may be more than one exhaust outlet 13 to which the exhaust gases are channels from the one exhaust manifold. In the example shown in FIG. 1, the engine 2 comprises two exhaust manifolds and the exhaust system 12 channels exhaust gases from a first exhaust manifold to at least one first exhaust outlets and from a second exhaust manifold to at least one second exhaust outlets. The exhaust system may combine the flows of exhaust gases from multiple exhaust manifolds along the path from the exhaust manifolds to at least one exhaust outlet 13.

The exhaust system 12 may comprise at least one exhaust component that acts on the exhaust gases being channelled through the exhaust system. The exhaust components act on the exhaust gases so as to alter the sound of the engine that is transmitted along the exhaust system to the exhaust outlet(s). The exhaust system 12 also comprises a plurality of exhaust pipes which channel the exhaust gases (i) from the exhaust manifold(s) to an exhaust component, (ii) between the exhaust components (where there is more than one), and (iii) from an exhaust component to at least one exhaust outlet. The exhaust pipes may connect the exhaust components together in series between the exhaust manifold and the at least one exhaust outlet.

The exhaust components may comprise one or more of the following:

- A turbocharger 10. An exhaust inlet 14 of the turbocharger 10 may be connected to the exhaust manifold 11 by an exhaust pipe 15. The exhaust inlet 14 permits exhaust gases to flow into the turbocharger 10. An exhaust outlet 16 of the turbocharger 10 may permit exhaust gases to flow out of the turbocharger 10. The exhaust outlet 16 may be connected to an exhaust pipe 17 to channel the exhaust gases towards the exhaust outlet(s). The turbocharger assists the flow of air into the intake manifold by obtaining power from the flow of the exhaust gases through the turbocharger. The turbocharger may comprise a first impeller which assists the flow of air into the intake manifold. This first impeller can be powered by the flow of exhaust gases flowing over a second impeller connected to the first impeller. The turbocharger comprises the second impeller. The presence of the turbocharger in the flow path of the exhaust gases from the exhaust manifold to the exhaust outlet(s) alters the engine sounds that are transmitted along the exhaust system to the exhaust outlet(s) 13. This may mean that the engine sounds from the engine are muffled or otherwise changed. For instance, a turbocharger can add a whining sound to the engine sound being transmitted along the exhaust system.
- An exhaust gas treatment device 18, 19. The exhaust system may comprise more than one exhaust gas treatment device for each channel of exhaust gases from the exhaust manifold to exhaust outlet(s). Examples of exhaust gas treatment devices are catalytic convertors, and gasoline particulate filters otherwise known as anti-particulate filters. Each of these devices acts on the exhaust gases in some way to change the constituents of the exhaust gases. The exhaust system may comprise a catalyst followed by an anti-particulate filter in series connected together by exhaust pipes 21. The exhaust system may comprise a catalyst followed by an anti-particulate filter in series connected together by exhaust pipes 21 for each channel between an exhaust manifold 11 and exhaust outlet 13.

A silencer 20. The silencer 20 acts on the flow engine sounds along the exhaust system to change the sounds and/or reduce the level of sounds that flow along the exhaust system.

As shown in FIG. 1, the exhaust system may comprise a turbocharger, a catalytic convertor and an anti-particulate filter along a first set of exhaust pipes that channel exhaust gases from a first exhaust manifold to at least one exhaust outlet and comprise a turbocharger, a catalytic convertor and an anti-particulate filter along a second set of exhaust pipes that channel exhaust gases from a second exhaust manifold to at least one exhaust outlet.

As discussed above, the presence of one or more exhaust components along the exhaust system causes changes to the engine sounds that are transmitted along the exhaust system to the exhaust outlet(s). This can be detrimental to the perception of the vehicle in certain circumstances. For instance, if the vehicle is a high-performance sports car then the exhaust components may serve to alter the sounds emanating from the exhaust outlets such that there is a reduction in the perception that the vehicle is high-performance.

To address this issue, the vehicle is provided with at least one sound bypass device 22 for the exhaust system which allows the engine generated sounds to be transmitted around one or more of the exhaust components while the exhaust gases still flow through the exhaust components. Thus, the sound bypass device 22 is configured to transmit engine-generated sounds through the sound bypass device 22 but not permit the flow of exhaust gases to flow through the sound bypass device 22. The sound bypass device 22 is configured to prevent the flow of exhaust gases through the sound bypass device 22.

The sound bypass device 22 comprises a sound inlet 23 which is connected to a first location on the exhaust system 12 before one of the exhaust components along the flow path of the exhaust gases. I.e. closer to the exhaust manifold 11 along the flow of the exhaust gases within the exhaust system than the exhaust component. The sound bypass device 22 comprises a sound outlet 27 which is connected to the exhaust system 12 after at least one of the exhaust components along the flow path of the exhaust gases. I.e. farther from the exhaust manifold 11 along the flow of the exhaust gases within the exhaust system than the at least one exhaust component. The sound outlet 27 may be connected after the final exhaust component along the flow path of the exhaust gases. The sound outlet 27 may be connected to an exhaust outlet 13.

The sound inlet 23 may be connected to the exhaust system 12 before all of the exhaust components. I.e. the sound inlet 23 may be connected to the exhaust system 12 between the exhaust manifold and the first exhaust component along the exhaust system in the direction of flow of the exhaust gases. The sound inlet 23 may be connected to an exhaust pipe which is connected between the exhaust manifold and the first exhaust component. The first exhaust component may be a turbocharger 10 as shown in FIG. 1. In this case, the exhaust pipe to which the sound inlet 23 is connected may be connected to the exhaust inlet 14 of the turbocharger 10.

The sound bypass device comprises a first sound transmission tube 24 configured to conduct engine-generated sound pulses from the first location on the exhaust system 12. The first sound transmission tube 24 may be an input tube. The first sound transmission tube 24 is configured to conduct sound pulses generated by the engine 2 along its length to a sound transmission device 25. Thus, the sound bypass device 22 comprises a sound transmission device 25 coupled to the first sound transmission tube 23. The sound transmission device 25 is configured to receive the sound pulses and transmit them to a second sound transmission tube 26. The second sound transmission tube 26 may be an output tube. The second sound transmission tube 26 is configured to conduct sound pulses generated by the engine 2 from the sound transmission device 25 to the sound outlet 27.

The sound transmission device 25 comprises a sound inlet 28 to which the first sound transmission tube 24 is connected. The sound transmission device 25 comprises a sound outlet 29 to which the second transmission tube 26 is connected. The sound transmission device 25 is configured to permit engine-generated sound pulses to be transmitted from the sound transmission device 25 sound inlet 28 to the sound transmission device sound outlet 29. The sound transmission device 25 is configured to prevent the flow of exhaust gases through the sound transmission device 25 from the sound transmission device sound inlet 28 to the sound transmission device sound outlet 29. The sound transmission device 25 may comprise a diaphragm 30 housed within a chamber 31. The diaphragm 30 may be formed of one or more membranes. In the case that the diaphragm 30 is formed of more than membrane the membranes may be spaced apart from each other.

Diaphragm 30 is connected across the diameter of the chamber 31 such that sound pulses travelling down the input tube into the chamber drive the motion of the diaphragm. Chamber 31 preferably has a cross-section of greater diameter than input tube 24. The diaphragm 30 moves in response to changes in pressure generated by the engine 10 in the exhaust system 12. Because the diaphragm 30 is configured to move in accordance with sound pulses received from the engine 10, the variations in pressure on side 32 of the chamber to which the input tube 24 is connected are transferred into side 33 of the chamber to which an output tube 26 is connected. Sound pulses travelling down the input tube can therefore pass through the diaphragm 30 (and hence the chamber 31) and into output tube 26. Thus, diaphragm 30 prevents exhaust gases from flowing from the side of the chamber to which the input tube 24 is connected to the side of the chamber to which the output tube 26 is connected.

The sound bypass device 22 therefore enables engine-generated sound pulses to be transmitted from one position along the exhaust system 12 to another position along the exhaust system 12 thus bypassing the sound-altering exhaust components to provide a greater range and/or better sounding sound pulses to the later parts of the exhaust. The sound bypass device 22 may transmit the engine-generated sound pulses to a position near the exhaust outlet which means that the engine-generated sound pulses are delivered to the outside of the car via the exhaust outlet without being altered by the exhaust components.

Figure 2:
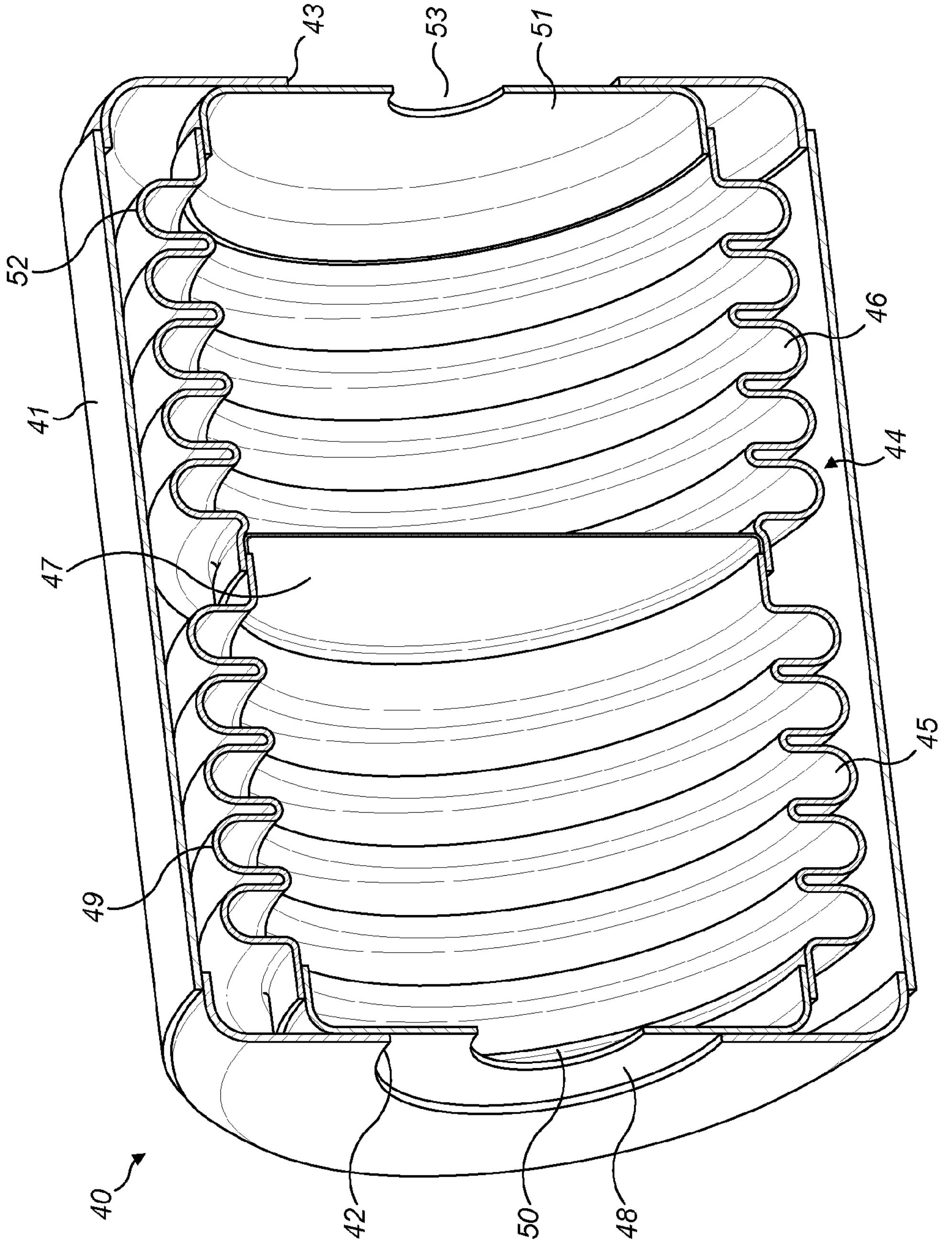
FIG. 2 shows a cut through view of a sound transmission device.

FIG. 2 shows a particular configuration of a sound transmission device 25 shown in FIG. 1. FIG. 2 shows a cut through view of a sound transmission device 40. The sound transmission device 40 comprises a housing 41. Housing 41 comprises first outlet 42 and a second outlet 43 through which the first and second sound transmission tubes 24, 26 can respectively connect. The housing encloses a chamber 44. Chamber 44 is divided into a first volume 45 and second volume 46 by a diaphragm 47. The diaphragm 4 seals to the chamber 44 so that exhaust gases are prevented from flowing between the first volume 45 and the second volume 46. The diaphragm 4 may be formed of metal.

The first volume 45 is defined by a first end plate 48, the diaphragm 47 and a first membrane 49 which is connected between the first end plate 48 and the diaphragm 47 around the perimeter of the first end plate 48 and the diaphragm 47. The membrane seals around the perimeter of the first end plate 48 and around the perimeter of the diaphragm 47 to enclose the first volume 45. The first end plate 48 comprises a first inlet 50 to which a sound transmission tube can be connected. The sound transmission device 40 comprises a first resilient biasing device which causes the position of the diaphragm 47 to return to a rest position relative to the first end plate 48 when there are no engine-generated sound pulses being transmitted through the sound transmission device 40. The first resilient biasing device may be part of first membrane 49. As shown in FIG. 2, the first membrane may be a bellows which comprises concertinaed sides to allow it to expand and contract and thus permit the diaphragm 47 to move. Alternatively, the resilient biasing device may be connected between first end plate 48 and diaphragm 47 to bias the position of the diaphragm 47 towards a rest position.

The second volume 46 is defined by a second end plate 51, the diaphragm 47 and a second membrane 52 which is connected between the second end plate 51 and the diaphragm 47 around the perimeter of the second end plate 51 and the diaphragm 47. The second membrane 52 seals around the perimeter of the second end plate 51 and around the perimeter of the diaphragm 47 to enclose the second volume 46. The second end plate 51 comprises a second inlet 53 to which a sound transmission tube can be connected. The sound transmission device 40 comprises a second resilient biasing device which causes the position of the diaphragm 47 to return to a rest position relative to the second end plate 51 when there are no engine-generated sound pulses being transmitted through the sound transmission device 40. The second resilient biasing device may be part of second membrane 51. As shown in FIG. 2, the membrane may be a bellows which comprises concertinaed sides to allow it to expand and contract and thus permit the diaphragm 47 to move. The first and second membranes 49, 51 may be formed of metal.

The first and second membranes 49, 51 permit the diaphragm 47 to move in along a direction running between the first end plate 48 and the second end plate 51. As shown in FIG. 2, the first and second volumes 45, 46 may be generally cylindrical and the diaphragm 47 is able to move along the axial direction of the cylinder.

Although first and second membranes have been discussed, it will be apparent that these could be formed as one piece with the diaphragm disposed along its length.

The spring rate of the first resilient biasing device (and thus the first membrane) and the spring rate of the second resilient biasing device (and thus the second membrane) may be selected to produce a particular transfer function for the engine-generated sound pulses from one side of the diaphragm to the other.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle comprising:

an internal combustion engine having at least one cylinder, the internal combustion engine comprising an exhaust manifold for collecting exhaust gases expelled from the at least one cylinder;

an exhaust system configured to channel exhaust gases along a flow path from the exhaust manifold to at least one exhaust outlet, the exhaust system comprising at least one exhaust component configured to act on exhaust gases flowing though the exhaust component and causing an alteration to engine-generated sound pulses passing through the exhaust component; and a sound bypass device comprising a sound inlet port at a first location on the exhaust system before a first exhaust component along the flow path and a sound outlet port at a second location on the exhaust system after the first exhaust component along the flow path, the sound bypass device being configured to transmit engine-generated sound pulses from the sound inlet port to the sound outlet port whilst preventing flow of exhaust gases from the sound inlet port to the sound outlet port, the sound bypass device further comprising a sound transmission device, the sound transmission device comprising:

a sound inlet port being connected to the sound inlet port of the sound bypass device and a sound outlet port being connected to the sound outlet port of the sound bypass device, the sound transmission device being configured to transmit engine-generated sound pulses from the sound inlet port of the sound bypass device to the sound outlet port of the sound bypass device whilst preventing the flow of exhaust gases from the sound inlet port of the sound bypass device to the sound outlet port of the sound bypass device; and a diaphragm housed in a chamber connected to the first sound inlet port of the sound transmission device, the diaphragm having a perimeter running around an exterior edge of the diaphragm, the diaphragm being connected across the chamber and configured such that, in response to engine-generated sound pulses being conducted from the sound inlet port of the sound transmission device into the chamber, the diaphragm vibrates so as to transmit the engine-generated sound pulses across the diaphragm from a first side of the chamber at which the sound inlet port of the sound transmission device is located to a second side of the chamber at which the sound outlet port of the sound transmission device is located, the chamber being divided into a first volume, to the first side of the chamber, and a second volume, to the second side of the chamber, the first volume being defined by the diaphragm, a first end wall and a first flexible membrane that seals around the perimeter of the diaphragm and connects to the first end wall to enclose the first volume, the second volume being defined by the diaphragm a second end wall and a second flexible membrane that seals around the perimeter of the diaphragm and connects to the second end wall to enclose the second volume.

2. The vehicle according to claim 1, wherein the diaphragm is connected across the chamber to prevent flow of exhaust gases from the first side of the chamber to the second side of the chamber.

3. The vehicle according to claim 1, wherein the first and second flexible membranes resiliently bias the diaphragm to a rest position when no engine-generated sound pulses are being transmitted through the sound bypass device.

4. The vehicle according to claim 1, wherein the first and second flexible membranes are bellows.

5. The vehicle according to claim 4, wherein the first and second flexible membranes are bellows having concertinaed sides, the diaphragm having two faces, one facing towards each of the first and second volumes, and the concertinas running parallel to the faces of the diaphragm.

6. The vehicle according to claim 1, wherein the first and second membranes are formed as one piece with the diaphragm disposed along the piece's length.

7. The vehicle according to claim 1, wherein the exhaust system comprises a plurality of exhaust pipes which respectively channel the exhaust gases from the exhaust manifold to an exhaust component, and from an exhaust component to at least one exhaust outlet.

8. The vehicle according to claim 7, wherein the exhaust system comprises a plurality of exhaust components and the plurality of exhaust pipes respectively channel the exhaust gases from the exhaust manifold to an exhaust component, between the exhaust components, and from an exhaust component to at least one exhaust outlet.

9. The vehicle according to claim 7, wherein the first location is on an exhaust pipe which channels exhaust gases from the exhaust manifold to the first exhaust component.

10. The vehicle according to claim 8, wherein the first location is on an exhaust pipe which channels exhaust gases between a second exhaust component and the first exhaust component.

11. The vehicle according to claim 9, wherein the second location is on an exhaust pipe after the first exhaust component along the flow path.

12. The vehicle according to claim 9, wherein the second location is on an exhaust pipe which channels exhaust gases to the at least one exhaust outlet.

13. The vehicle according to claim 1, the exhaust system comprising a plurality of exhaust components, the exhaust components being one or more of a turbocharger, an exhaust gas treatment device, and a silencer.

14. The vehicle according to claim 1, wherein the first exhaust component is a turbocharger.

15. The vehicle according to claim 1, wherein the exhaust system comprises a turbocharger as the first exhaust component, a catalytic convertor, a gasoline particulate filter and a silencer, the turbocharger is connected to the exhaust manifold by a first exhaust pipe, the turbocharger is connected to the catalytic convertor by a second exhaust pipe, the catalytic convertor is connected to the gasoline particular filter by a third exhaust pipe, the gasoline particulate filter is connected to the silencer by a fourth exhaust pipe and the silencer is connected to the at least one exhaust outlet by a fifth exhaust pipe.

16. The vehicle according to claim 15, wherein the first location is on the first exhaust pipe and the second location is on the fifth exhaust pipe.

17. The vehicle according to claim 1, wherein the internal combustion engine comprises a plurality of cylinders and two exhaust manifolds for collecting exhaust gases expelled from respective sets of cylinders, the exhaust system is configured to channel exhaust gases along a first flow path from a first exhaust manifold to at least one exhaust outlet and a second flow path from a second exhaust manifold to at least one exhaust outlet, the exhaust system comprising at least one exhaust component configured to act on exhaust gases flowing along the first flow path and at least one exhaust component configured to act on exhaust gases flowing along the second flow path, and the vehicle comprises:

a first sound bypass device comprising a first sound inlet port at a first location on the first flow path of the exhaust system before a first exhaust component along the first flow path and a first sound outlet port at a second location on the first flow path of the exhaust system after the first exhaust component along the first flow path, the sound bypass device being configured to transmit engine-generated sound pulses from the first sound inlet port to the first sound outlet port whilst preventing flow of exhaust gases from the first sound inlet port to the first sound outlet port; and a second sound bypass device comprising a second sound inlet port at a first location on the second flow path of the exhaust system before a first exhaust component along the second flow path and a second sound outlet port at a second location on the second flow path of the exhaust system after the first exhaust component along the second flow path, the second sound bypass device being configured to transmit engine-generated sound pulses from the second sound inlet port to the second sound outlet port whilst preventing flow of exhaust gases from the second sound inlet port to the second sound outlet port.

18. A sound transmission device for connection to an exhaust system of a vehicle, the exhaust system being configured to channel exhaust gases along a flow path from an engine to at least one exhaust outlet, the sound transmission device comprising:

a sound inlet port and a sound outlet port, the sound transmission device being configured to transmit engine-generated sound pulses from the sound inlet port to the sound outlet port whilst preventing the flow of exhaust gases from the sound inlet port to the sound outlet port; and a diaphragm housed in a chamber connected to the first inlet port, the diaphragm being connected across the chamber and configured such that, in response to engine-generated sound pulses being conducted from the sound inlet port of the sound transmission device into the chamber, the diaphragm having a perimeter running around an exterior edge of the diaphragm, the diaphragm vibrates so as to transmit the engine-generated sound pulses across the diaphragm from a first side of the chamber at which the sound inlet port of the sound transmission device is located to a second side of the chamber at which the sound outlet port of the sound transmission device is located, the chamber being divided into a first volume, to the first side of the chamber, and a second volume, to the second side of the chamber, the first volume being defined by the diaphragm, a first end wall and a first flexible membrane that seals around the perimeter of the diaphragm and connects to the first end wall to enclose the first volume, the second volume being defined by the diaphragm a second end wall and a second flexible membrane that seals around the perimeter of the diaphragm and connects to the second end wall to enclose the second volume.

19. The sound transmission device according to claim 18, wherein the diaphragm is connected across the chamber to prevent flow of exhaust gases from the first side of the chamber to the second side of the chamber.

20. The sound transmission device according to claim 18, wherein the first and second flexible membranes resiliently bias the diaphragm to a rest position when no engine-generated sound pulses are being transmitted through the sound transmission device.

21. The sound transmission device according to claim 18, wherein the first and second flexible membranes are bellows.

22. The sound transmission device according to claim 21, wherein the first and second flexible membranes are bellows having concertinaed sides, the diaphragm having two faces, one facing towards each of the first and second volumes, and the concertinas running parallel to the faces of the diaphragm.

23. The sound transmission device according to claim 18, wherein the first and second membranes are formed as one piece with the diaphragm disposed along the piece's length.

* * * * *